United States Patent [19]

Kobayashi

[11] Patent Number: 4,464,144

[45] Date of Patent: Aug. 7, 1984

[54] V-BELT TYPE SPEED CHANGE MECHANISM

[75] Inventor: Takashi Kobayashi, Hamamatsu, Japan

[73] Assignee: Yamaha Hatsudoki Kabushiki Kaisha, Shizuoka, Japan

[21] Appl. No.: 353,817

[22] Filed: Mar. 2, 1982

[30] Foreign Application Priority Data

Mar. 10, 1981 [JP] Japan ................... 56/034140

[51] Int. Cl.³ ............ F16H 11/06; F16H 11/02; F16H 55/56; F16H 55/52
[52] U.S. Cl. ........................ 474/14; 474/11; 474/13; 474/43
[58] Field of Search ............ 474/14, 43, 44, 45, 474/13, 15, 16

[56] References Cited

U.S. PATENT DOCUMENTS

| 3,459,061 | 8/1969 | Barnish et al. | 474/15 |
| 3,574,366 | 4/1971 | Thostenson | 474/14 |
| 3,597,987 | 6/1971 | Kickhaefer | 474/14 |
| 3,759,111 | 9/1973 | Hoff | 474/14 |
| 3,961,539 | 6/1976 | Tremblay et al. | 474/14 |
| 4,027,544 | 6/1977 | Kobayashi | 474/14 |

FOREIGN PATENT DOCUMENTS 922127 3/1973 Canada ................... 474/14

Primary Examiner—Leslie A. Braun
Assistant Examiner—Dwight G. Diehl
Attorney, Agent, or Firm—Kerkam, Stowell, Kondracki & Clarke

[57] ABSTRACT

A V-belt type continuous speed change mechanism including a stationary disc secured to the driving shaft and a movable disc axially slidable with respect to the shaft. The discs define a circumferential groove of a V-shaped configuration with which a V-belt is engaged. The movable disc is formed at its back side with slider accommodating recesses of a circular cross-section extending in parallel with the shaft. A slider is received in the recess for rotation about an axis parallel with the driving shaft and has a groove extending in parallel with the driving shaft. A spider secured to the driving shaft has radial arms each of which is fitted at an end to the long groove in the slider.

4 Claims, 6 Drawing Figures

V-BELT TYPE SPEED CHANGE MECHANISM

The present invention relates to improvements in a V-belt type continuous speed change mechanism.

There has already been proposed according to the prior art a V-belt type continuous speed change mechanism, in which two discs having conical side surfaces are mounted on a rotatable shaft to provide a pulley assemble of a variable diameter. More specifically one of the discs is secured to the shaft whereas the other is made axially slidable on the shaft and such that a V-belt is made to engage with the conical surfaces of the two discs. The speed change mechanism thus proposed has its speed changed by moving the slidable or movable disc thereby to change the effective diameter of the pulley assembly. In this proposal, the movable disc is required not only to move axially on the shaft but also to rotate integrally with the same so as to transmit the rotations of that shaft to the V-belt. In other words, the mechanism for transmitting the rotations of the shaft to the movable disc is required at the same time to allow the movable disc to axially move.

FIG. 1 is a sectional view showing an essential portion of that rotation transmitting mechanism of the continuous speed change mechanism according to the prior art. In FIG. 1, reference numeral 1 designate guides which are formed at the back of the movable disc and in parallel with the rotatable shaft so that their opposing surfaces provide guide surfaces 2 extending in parallel with the shaft. Numeral 3 indicates the center of rotation of that shaft, and numeral 4 indicates a spider which is fixed to the same shaft and which is formed with a plurality of radial arms 5. Each of these arms 5 has its end portion located between the aforementioned guide surfaces 2 and formed with a through hole 6. At the opposite ends of the opening 6, the arm 5 is fitted with mov-sliders 7 which is made of a synthetic resin. These sliders 7 are adapted to slidably abut against and contact with the guide surfaces 2.

Now, if the spider 4 is rotated counter-clockwise in the plane of the drawing, the slider 7 at the lefthand side of the drawing abuts against the corresponding guide surface 2 not throughout the surface. This invites disadvantages that the initial wear of the slider 7 above all is increased and that the play (i.e., backlash) between the spider 4 and the movable disc is augmented. Moreover, since lubricating oil is applied to the sliding surfaces of the guide surfaces 2 and the sliders 7, there arises a problem that the lubricating oil is splashed by the centrifugal force inclusive because those guide surfaces 2 are opened in their radial direction.

The present invention has been conceived in view of the disadvantages thus far described and has an object to provide a V-belt type continuous speed change mechanism which is enabled to prevent the wear due to the unsymmetrical abutment of the sliders and to restrain the splash of the lubricating oil so that the backlash may be little increased even after a long use.

In order to achieve the above-specified object, the present invention provides a V-belt type continuous speed change mechanism comprising a pulley assembly constituted by a stationary disc secured to a rotatable shaft and a movable disc axially slidable on said rotatable shaft, said stationary and movable discs having opposed side surface which are inclined to form a V-shaped circumferential groove therebetween, a V-belt adapted to be engaged with the opposed side surfaces of said discs with an effective radius of said pulley assembly being dependent on whereby the running radius of said V-belt is changed an axial position of said movable disc, said movable disc being formed at a side opposite to said side surface with slider accommodating recesses of a circular section, which extend in parallel with said shaft, said recess being cut-off at a side adjacent to at said shaft, a slider received in said recess for rotation about an axis substantially parallel with said shaft, said slider formed with a long groove extending in parallel with said shaft, a spider which is fixed to said shaft formed with radial arms, each of said arms having an end portion fitted to said long groove.

The present invention will now be described in detail with reference to the accompanying drawings.

Figure 1:
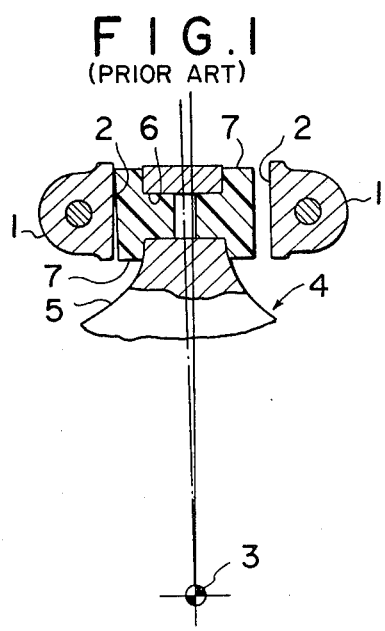
FIG. 1 is a sectional view of an essential portion of a continuous speed change mechanism according to the prior art.
Figure 4:
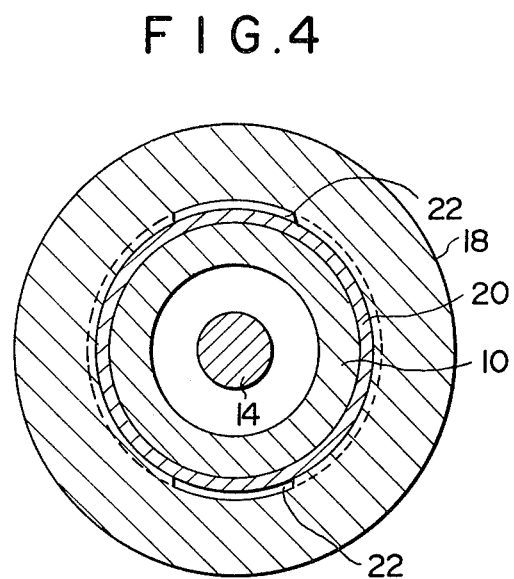
FIG. 4 is a section taken along line IV—IV of FIG. 3.
Figure 3:
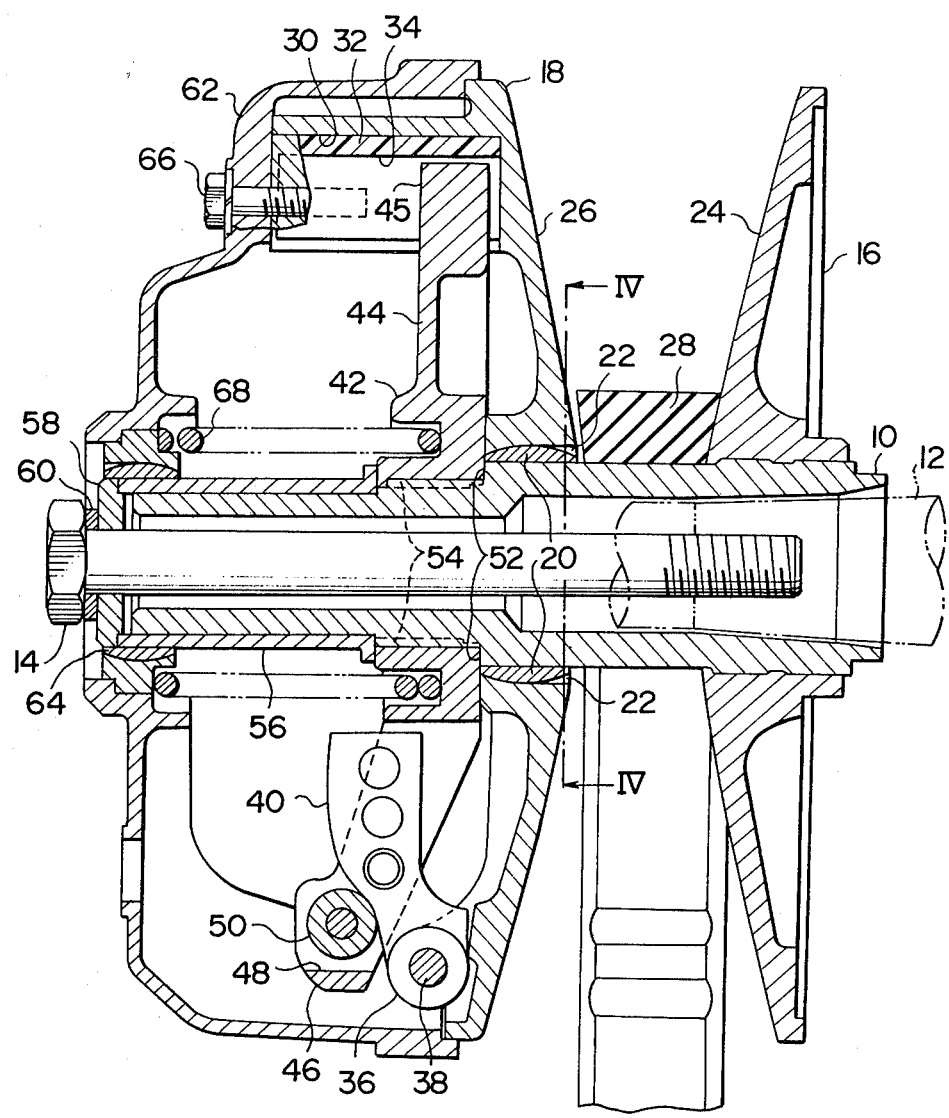
FIG. 3 is a section taken along line III—III of FIG. 2.

In FIG. 3, reference numeral 10 indicates a rotatable shaft having one end, in which a drive shaft 12 is fitted such that the shaft 10 is fixed to the drive shaft 12 by means of a long bolt 14 inserted from the other end of that shaft 10. Numeral 16 indicates a stationary disc which is fixed to the rotating shaft 10 at a position close to one end of the same, i.e., the aforementioned drive shaft 12. Numeral 18 indicates a movable disc which is disposed to face the aforementioned stationary disc 16 and which is so held on the rotating shaft 10 that it can slide in the axial direction. More specifically, the movable disc 18 has a side surface of a substantially conical shape and an inner periphery held on the outer circumference of a bearing member 20, which is made rotatable and axially slidable on the rotatable shaft 10, so that it is made slidable together with that bearing member 20 and is enabled to slightly rock by the guidance of the outer circumference of that bearing member 20. Moreover, the sliding contact surface of the movable disc 18, which slides on and contacts with the outer circumference of the bearing member 20, is notched at two portions, as shown by the numeral 22 in FIGS. 3 and 4, so that the bearing member 20 can be put in the movable disc 18 by inserting it through these notches 22 with the axis of the bearing member 20 oriented at a right angle with respect to the axis of the movable disc 18 and then turning it by an angle of 90 degrees.

The opposing surfaces of the stationary and movable discs 16 and 18 are of conical configurations as shown by the numerals 24 and 26, with which a V-belt 28 is engaged. Thus, a sheave or pulley assembly is provided by these two discs 16 and 18. The aforementioned movable disc 18 is formed at its back surface with three arcuate slider accommodating portions 30 which extend in parallel with the aforementioned rotatable shaft 10 and which are angularly spaced by an angle of 120 degrees from one another, although only one of them is shown. The slider accommodating portion 30 is formed to have a circular section and is notched at the side adjacent to the rotating shaft 10, as is apparent from FIGS. 2 and 4. In the slider accommodating portions 30 thus constructed, there are so mounted three complimentary shaped sliders sliders 32 made of a hard synthetic resin that they can rotate within the corresponding slider accommodating portions 30. Those sliders 32 are formed with long grooves 34 of a rectangular cross-section, which extend in parallel with the rotatable shaft 10.

Numeral 36 indicates centrifugal weights, each of which is mounted on the back of the aforementioned movable disc 18 such that it is interposed between any of the two adjacent slider accommodating portions 30. More specifically, the centrifugal weights 36 are so mounted on the movable disc 18 that they are enabled to rotate in radial planes about chordwise pins 38, which are directed prependicularly to the shaft 10, so that the weights 36 are moved apart from the rotating shaft 10 under the centrifugal force which is generated as a result of the rotations of the movable disc 18. Moreover, the centrifugal weights 36 are formed at the sides opposite to the disc 18 with cam surfaces 40.

Numeral 42 indicates a spider which is formed with three radially protruding arms 44 (although only one of them is shown in the drawings) and three cam follower holding arms 46 (although only one of them is shown in the drawings) also radially protruding and each interposed between any two adjacent arms 44. Each arm 44 has an end portion 45 formed to have a rectangular shape complementary to the groove 34 so that it can be slidably fitted to the long groove 34 of the aforementioned slider 32. Each of the cam follower holding arms 46 is formed with an opening 48 which extends in parallel with the shaft 10 and in which a cam follower 50 is rotatably mounted so as to abut against and contact with the cam surface 40 of the aforementioned centrifugal weight 36.

The spider 42 is mounted on the shaft 10 from the lefthand side in the plane of FIG. 3, until it comes into abutting contact with a stepped portion 52 formed on the rotatable shaft 10, and is splined at 54 to the rotating shaft 10. When the spider 42 is to be mounted on the rotating shaft 10, the end portions 45 of the spider arms 44 are fitted in the long grooves 34 of the aforementioned sliders 32, and the rotating portions of the centrifugal weights 36 are inserted into the openings 48 of the cam follower holding arms 46 until the cam surfaces 40 of the centrifugal weights 36 come into engagement with the cam followers 50.

Numeral 56 indicates a collar which is mounted on the shaft 10 from the lefthand side of FIG. 3 and which has its one end abutting against and contacting with the aforementioned spider 42 and its other end urged through a thrust plate 58 and a washer 60 toward the spider 42 by means of the aforementioned long bolt 14. In short, the spider 42 is clamped between the stepped portion 52 of the rotating shaft 10 and the collar 56 and is made rotatable with the rotating shaft 10 by the spline 54.

Figure 2:
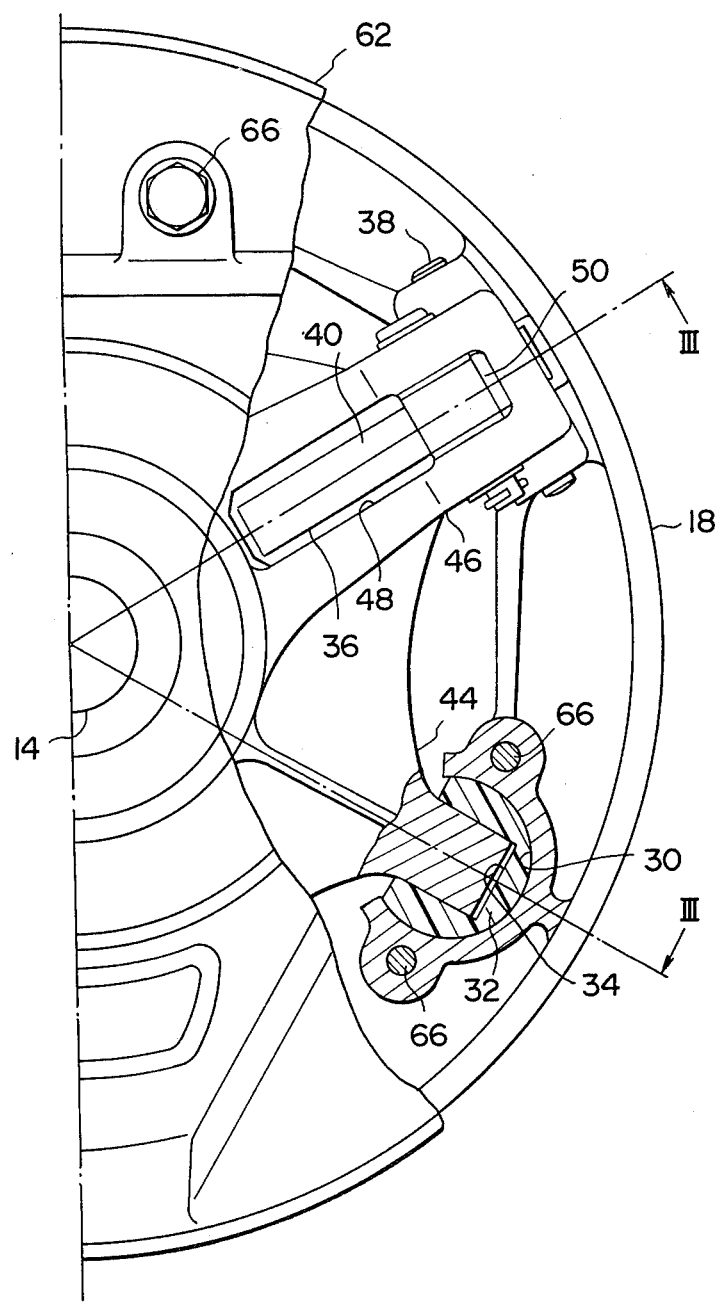
FIG. 2 is a partially cut-away front elevation showing one embodiment of the present invention.

Numeral 62 indicates a generally cup-shaped cover 62 which has its center portion slidably held through a bearing member 64 on the aforementioned collar 56 and has a widely open edge abutting against and contacting with the outer circumferencial edge of the aforementioned movable disc 18. The cover 62 is fixed to the movable disc 18 by means of six bolts 66 (although only three of them are shown in FIG. 2) which are positioned to interpose between the aforementioned slider accommodating portions 30. Moreover, a coil spring 68 is sandwiched under compression between the inner wall of the cover 62 and the aforementioned spider 42.

The coil spring 68 thus sandwiched forces the cover 62 and the movable disc 18 in the leftward direction of FIG. 3 away from the stationary disc 16. Moreover, the bearing member 64 is attached through an annular member 70 to the cover 62, but its explanation is not repeated because it has a similar construction to that of the bearing member 20 of the aforementioned movable disc 18.

Figure 5A:
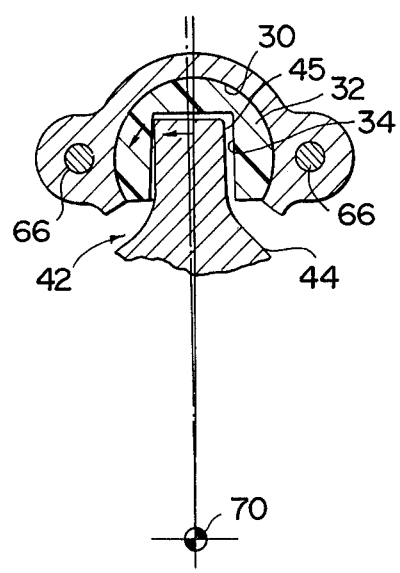
FIG. 5 is a sectional view showing an essential portion for explaining the operations of the present invention.
Figure 5B:
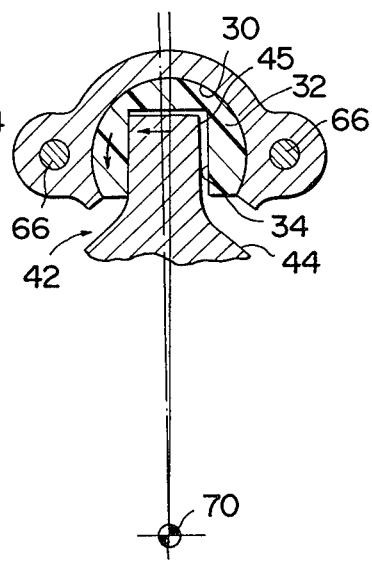

The operations of the embodiment under consideration will be described in the following. First of all, when the shaft 10 is stationary, the movable disc 18 and the cover 62 are positioned at the lefthand side of FIG. 3 by the spring force of the coil spring 68, thus leaving a wide spacing between the two discs 16 and 18. As a result, the effective radius of the pulley assembly is decreased. When the rotatable shaft 10 and the stationary disc 16 are rotated, the movable disc 18 and the cover 62 are also rotated through the spider 42, the end portions 45 of the arms 44 and the sliders 32 whereby the centrifugal weights 36 are turned counter-clockwise in FIG. 3 by the rotations of the movable disc 18 thereby to have their cam surfaces 40 thrusting the cam followers 50 in the leftward direction of the drawing. Here, since the spider 42 holding the cam followers 50 is fixed to the shaft 10, the movable disc 18 and the cover 62 are moved rightwardly of the drawing in accordance with the movement of the centrifugal weights 36. These movements are so increased with the increase in the centrifugal force to be exerted upon the centrifugal weigths 36, i.e., and increase in the rotating speed of the shaft 10 whereby the effective radius of the pulley assembly is gradually increased. In this instance, the end portions 45 of the arms 44 of the spider 42 slide in the long grooves 34 of the sliders 32. The end portions 45 are fitted in the long grooves 34 of the sliders 32 thereby to transmit the rotations of the shaft 10, whereupon the sliders are so tuned that the sliding surfaces of the long grooves 34 and the leading end portions 45 are in face-to-face contact with each other. FIG. 5(A) illustrates the state before the forces of the end portions 45 are transmitted to the sliders 32, and FIG. 5(B) illustrates the state at which the end portions 45 are thrusting the sliders 32. If the spider 42 is rotated counter-clockwise about the axis of rotation of the shaft 10, as shown in FIGS. 5(A) and 5(B), one leading edge of each end portion 45 first abuts against and contacts with the inner wall of the corresponding long groove 34 as shown in FIG. 5(A) thereby to turn the corresponding slider 32 in the counter-clockwise direction. As a result, the corresponding end portion and long groove 45 and 34 come into face-to-face contact with each other as illustrated in FIG. 5(B).

The slider accommodating portions 30 of the embodiment thus far described are formed to have a cylindrical shape, as is apparent from FIG. 3. Nevertheless, those slider accommodating portions may be, in case the movable disc 18 is made by a die-cast process, of a frustoconical shape, so that the casting cores can readily be removed. The sliders may then be formed to correspond in shape to the frusto-conical shape.

The invention has thus been shown and described with reference to a specific embodiment, however, it should be noted that the invention is in no way limited to the details of the illustrated structures but changes and modifications may be made without departing from the scope of the appended claims.

I claim:

1. A V-belt type continuous speed change mechanism comprising a pulley assembly constituted by a stationary disc secured to a rotatable shaft and a movable disc axially slidable on said rotatable shaft, said stationary and movable discs each having an inclined side surface disposed opposed to each other to form a V-shaped circumferential groove therebetween, a V-belt adapted to be engaged with the opposed side surfaces of said discs with an effective radius of said pulley assembly being dependent on an axial position of said movable disc, said movable disc having at a side opposite to its side surface axially extending slider accommodating portions with recesses extending in parallel with said shaft, each of said recesses being of an arcuate a cross-section and having an axial opening toward said shaft and receiving a slider for rotation about an axis substantially parallel with said shaft, said slider being complimentary with said recess and formed with a long groove extending in parallel with and opening toward said shaft, a spider which is fixed to said shaft and formed with radial arms, each of said arms having an end portion fitted to said long groove.

2. V-belt type continuous speed change mechanism in accordance with claim 1 in which three slider accommodating recesses are formed at three equidistant angular positions on the movable disc.

3. V-belt type continuous speed change mechanism in accordance with claim 3 in which centrifugal mechanisms are provided between respective two adjacent recesses.

4. V-belt type continuous speed change mechanism in accordance with claim 1 in which said slider is made of a hard plastic material.

* * * * *

UNITED STATES PATENT AND TRADEMARK OFFICE
CERTIFICATE OF CORRECTION

PATENT NO. : 4,464,144
DATED : August 7, 1984
INVENTOR(S) : KOBAYASHI, Takashi

It is certified that error appears in the above-identified patent and that said Letters Patent is hereby corrected as shown below:

In Claim 3, line 2, delete "3" and add -- 2 --.

Signed and Sealed this

Fifth Day of March 1985

[SEAL]

*Attest:*

DONALD J. QUIGG

*Attesting Officer*     *Acting Commissioner of Patents and Trademarks*